(12) United States Patent
Hernandez-Zelaya

(10) Patent No.: US 6,730,865 B1
(45) Date of Patent: May 4, 2004

(54) ELECTRICAL INDUCTANCE OVERFLOW SWITCH SYSTEM

(76) Inventor: Rodolfo Hernandez-Zelaya, 4127 E. 98 Ave., Tampa, FL (US) 33617-4432

( * ) Notice: Subject to any disclaimer, the term of this patent is extended or adjusted under 35 U.S.C. 154(b) by 0 days.

(21) Appl. No.: 10/224,791

(22) Filed: Aug. 21, 2002

(51) Int. Cl.$^7$ ................................................. H01H 35/18
(52) U.S. Cl. ......................... 200/84 R; 73/308; 340/623
(58) Field of Search .............................. 200/84 R, 61.2, 200/84 A, 84 C; 340/623, 624

(56) References Cited

U.S. PATENT DOCUMENTS

| | | | | |
|---|---|---|---|---|
| 3,641,290 A | * | 2/1972 | Murphy et al. | 200/61.45 M |
| 5,151,685 A | * | 9/1992 | Spicer et al. | 200/61.04 |
| 5,228,304 A | * | 7/1993 | Ryan | 200/230 |
| 5,562,003 A | * | 10/1996 | Lefebvre | 73/308 |
| 6,362,742 B1 | * | 3/2002 | Serenil, Jr. | 200/84 A |

* cited by examiner

*Primary Examiner*—Elvin Enad
*Assistant Examiner*—M. Fishman
(74) *Attorney, Agent, or Firm*—Edward P. Dutkiewicz

(57) ABSTRACT

An electrical inductance overflow switch comprises a housing with an upper portion with a main central tube with a hole from top to bottom. A sideways extension runs outwards from the tube and terminates with a mounting clamp with gripping serrations. The lower portion of the housing has an open lower end with legs and a closed upper end coupled to the upper portion forming a continuous passageway through the main tube. A switch subassembly has a shaft between enlarged upper and lower ends. The shaft coupled has an inner wire passageway and is coupled at the upper end with the tube of the housing. A donut-shaped rigid electrically conductive float. A central hole in the float moves freely up and down the bearing surface. A washer shaped induction disk is coupled to the top of the float. A plurality of wires are contained within the passageway of the shaft.

4 Claims, 2 Drawing Sheets

ELECTRICAL INDUCTANCE OVERFLOW SWITCH SYSTEM

BACKGROUND OF THE INVENTION

1. Field of the Invention

The present invention relates to an electrical inductance overflow switch system and more particularly pertains to allowing a user to safely and conveniently control the level of a fluid in an air conditioner tray by the activation and deactivation of the production of the fluid.

2. Description of the Prior Art

The use of switches of known designs and configurations is known in the prior art. More specifically, switches of known designs and configurations previously devised and utilized for the purpose of activating and deactivating a switch through known methods and configurations are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,362,742 to Serenil, Jr. discloses a safety float device for air conditioning units. U.S. Pat. No. 4,757,305 to Peso discloses a water level indicator. U.S. Pat. No. 4,633,673 to Morrison et al. discloses an emergency shutoff for air conditioners. U.S. Pat. No. 2,600,659 to C. J. Koch, Jr. discloses a combined float and mercury switch. U.S. Pat. No. 3,110,161 to Maleck discloses a float switch assembly for air conditioning apparatus. Lastly, U.S. Pat. No. 2,981,196 to Zimmermann et al discloses a condensate pump and control means.

While these devices fulfill their respective, particular objectives and requirements, the aforementioned patents do not describe an electrical inductance overflow switch system that allows allowing a user to safely and conveniently control the level of a fluid in an air conditioner tray by the activation and deactivation of the production of the fluid.

In this respect, the electrical inductance overflow switch system according to the present invention substantially departs from the conventional concepts and designs of the prior art, and in doing so provides an apparatus primarily developed for the purpose of allowing a user to safely and conveniently control the level of a fluid in an air conditioner tray by the activation and deactivation of the production of the fluid.

Therefore, it can be appreciated that there exists a continuing need for a new and improved electrical inductance overflow switch system which can be used for allowing a user to safely and conveniently control the level of a fluid in an air conditioner tray by the activation and deactivation of the production of the fluid. In this regard, the present invention substantially fulfills this need.

SUMMARY OF THE INVENTION

In view of the foregoing disadvantages inherent in the known types of switches of known designs and configurations now present in the prior art, the present invention provides an improved electrical inductance overflow switch system. As such, the general purpose of the present invention, which will be described subsequently in greater detail, is to provide a new and improved electrical inductance overflow switch system and method which has all the advantages of the prior art and none of the disadvantages.

To attain this, the present invention essentially comprises an electrical inductance overflow switch for allowing the user to safely and conveniently control the level of a fluid in an air conditioner tray by the activation and deactivation of the production of the fluid. First provided is a switch housing fabricated of a rigid material. The switch housing has a lower portion and an upper portion. The upper portion has a main central tube. The main central tube is in a round tubular cylindrical configuration. The main central tube has a top end and a bottom end and a circumferential wall there between. A hole is provided through the length of the main central tube running from the top end to the bottom end. A rectilinear sideways extension runs outwards from the main central tube and terminates with a mounting clamp. The mounting clamp has a generally flat, U-shaped configuration with an outer surface and an inner surface. A pair of gripping serrations on the surfaces allow the clamp to grip a recipient surface. The lower portion of the housing has a generally round configuration with an inner face and an outer face and a wall thickness there between. The lower portion has an open lower end 40 with a plurality of downwardly projecting legs. The lower portion also has a closed upper end coupled to the upper portion. A central passageway is provided through the upper end of the lower portion forming a continuous passageway through the main tube to the top end. Next provided is a switch subassembly. The switch subassembly has a switch shaft. The switch shaft is fabricated of a rigid electrically insulating material and has a generally round cylindrical configuration with an enlarged upper end and an enlarged lower end and a bearing surface there between. The upper end of the shaft is coupled with the main central tube of the housing. The lower end of the shaft includes a flanged end piece. The shaft has an inner wire passageway running from the top of the shaft to between about sixty-five percent and seventy-five percent of the length of the shaft. The subassembly also has a float fabricated of rigid electrically conductive material. The float is in a donut-shaped configuration with a top side and a bottom side and a thickness there between. A central hole runs through the float. The hole is sized to allow the float to move freely up and down the bearing surface. A washer shaped induction disk fabricated of a buoyant material is coupled to the top of the float. Next provided is a plurality of wires. The wires are contained within the passageway of the shaft. The wires are continuous and pass through the shaft up through the hole in the main central tube. In this manner, the wires will provide a signal to activate an electrical component when the float is at the bottom of the shaft; and the wires will provide a signal to inactivate an electrical component when the float is at the top of the shaft.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrical inductance overflow switch system which has all of the advantages of the prior art switches of known designs and configurations and none of the disadvantages.

It is another object of the present invention to provide a new and improved electrical inductance overflow switch system which may be easily and efficiently manufactured and marketed.

It is further an object of the present invention to provide a new and improved electrical inductance overflow switch system which is of durable and reliable constructions.

An even further object of the present invention is to provide a new and improved electrical inductance overflow switch system which is susceptible of a low cost of manufacture with regard to both materials and labor, and which accordingly is then susceptible of low prices of sale to the consuming public, thereby making such electrical inductance overflow switch system economically available to the buying public.

Even still another object of the present invention is to provide an electrical inductance overflow switch system for allowing a user to safely and conveniently control the level of a fluid in an air conditioner tray by the activation and deactivation of the production of the fluid.

Lastly, it is an object of the present invention to provide a new and improved electrical inductance overflow switch comprising a housing having a lower portion and an upper portion with the upper portion having a main central tube with a top end and a bottom end and a hole running from the top end to the bottom end with the tube having a sideways extension running outwards from the tube and terminating with a mounting clamp having gripping serrations. The lower portion of the housing has an open lower end with a plurality of downwardly projecting legs and a closed upper end coupled to the upper portion forming a continuous passageway through the main tube to the top end. A switch subassembly has an enlarged upper end and an enlarged lower end with the upper end of the shaft coupled with the tube of the housing and with the shaft having an inner wire passageway running from the top of the shaft with the subassembly also having a float fabricated of rigid electrically conductive material having a donut-shaped configuration with a central hole running there through with the hole sized to allow the float to move freely up and down the bearing surface. The float has a washer shaped induction disk coupled to the top of the float. A plurality of wires are contained within the passageway of the shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
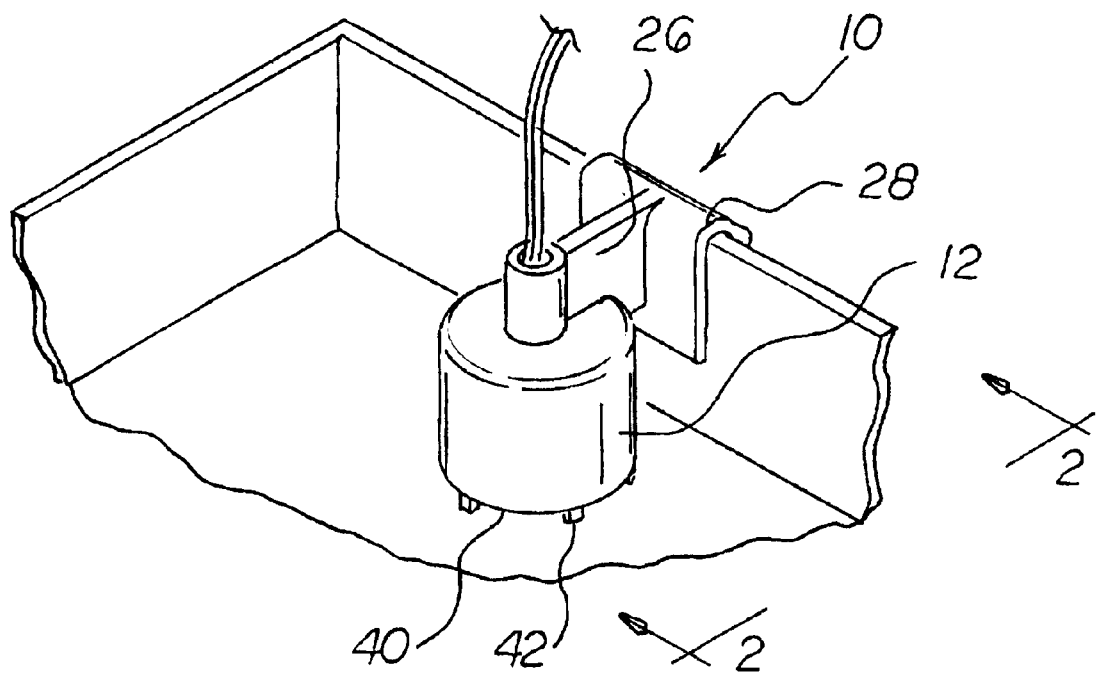
FIG. 1 is a perspective illustration of an electrical inductance overflow switch system constructed in accordance with the principles of the present invention.
Figure 2:
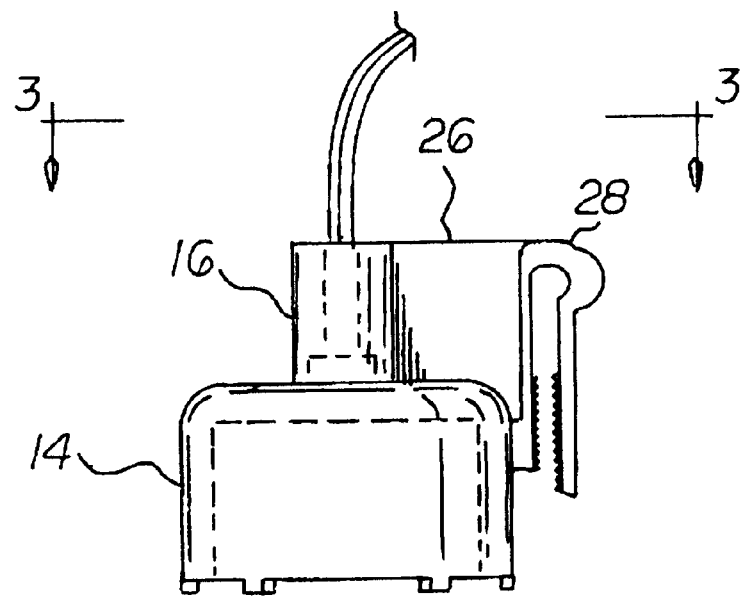
FIG. 2 is a side elevational view taken along line 2—2 of FIG. 1.
Figure 3:
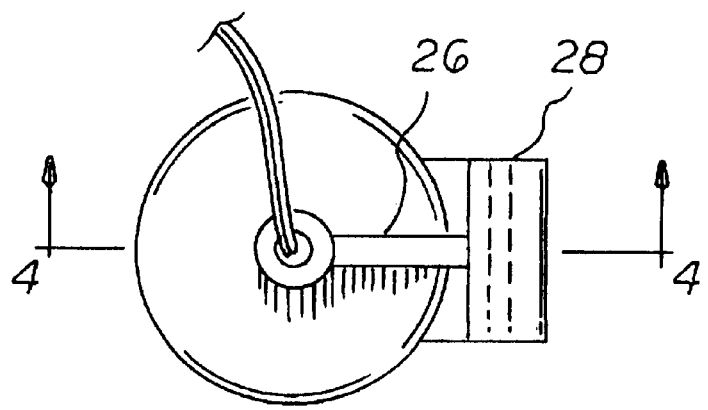
FIG. 3 is a top plan view taken along line 3—3 of FIG. 2.

With reference now to the drawings, and in particular to FIG. 1 thereof, the preferred embodiment of the new and improved electrical inductance overflow switch system embodying the principles and concepts of the present invention and generally designated by the reference numeral 10 will be described.

The present invention, the electrical inductance overflow switch system 10 is comprised of a plurality of components. Such components in their broadest context include a housing, a switch subassembly and wires. Such components are individually configured and correlated with respect to each other so as to attain the desired objective.

First provided is a switch housing 12 fabricated of a rigid material. The switch housing has a lower portion 14 and an upper portion 16. The upper portion has a main central tube 18. The main central tube is in a round tubular cylindrical configuration. The main central tube has a top end 20 and a bottom end 22 and a circumferential wall 24 there between. A hole 25 is provided through the length of the main central tube running from the top end to the bottom end. A rectilinear sideways extension 26 runs outwards from the main central tube and terminates with a mounting clamp 28. The mounting clamp has a generally flat, U-shaped configuration with an outer surface 30 and an inner surface 32. A pair of gripping serrations 34 on the surfaces allow the clamp to grip a recipient surface. The recipient surface is preferably a vertical sidewall of a tray for receiving water dripping from an air conditioner system. Note FIG. 1. The lower portion,of the housing has a generally round configuration with an inner face 36 and an outer face 38 and a wall thickness there between. The lower portion has an open lower end 40 with a plurality of downwardly projecting legs 42. The legs rest on the bottom wall of a tray adapted to receive water dripping from an air conditioner system. Note FIG. 1. The lower portion also has a closed upper end 44 coupled to the upper portion. A central passageway 46 is provided through the upper end of the lower portion forming a continuous passageway through the main tube to the top end.

Next provided is a switch subassembly 48. The switch subassembly has a switch shaft 50. The switch shaft is fabricated of a rigid electrically insulating material and has a generally round cylindrical configuration with an enlarged upper end 52 and an enlarged lower end 54 and a bearing surface there between. The upper end of the shaft is coupled with the main central tube of the housing. The lower end of the shaft includes a flanged end piece 56. The shaft has an inner wire passageway 58 running from the top of the shaft to between about sixty-five percent and seventy-five percent of the length of the shaft. The subassembly also has a float 60 fabricated of rigid electrically conductive material. The float is in a donut-shaped configuration with a top side 62 and a bottom side 64 and a thickness there between. A central hole 66 runs through the float. The hole is sized to allow the float to move freely up and down the bearing surface. A washer shaped induction disk 68 fabricated of a buoyant material is coupled to the top of the float.

Figure 4:
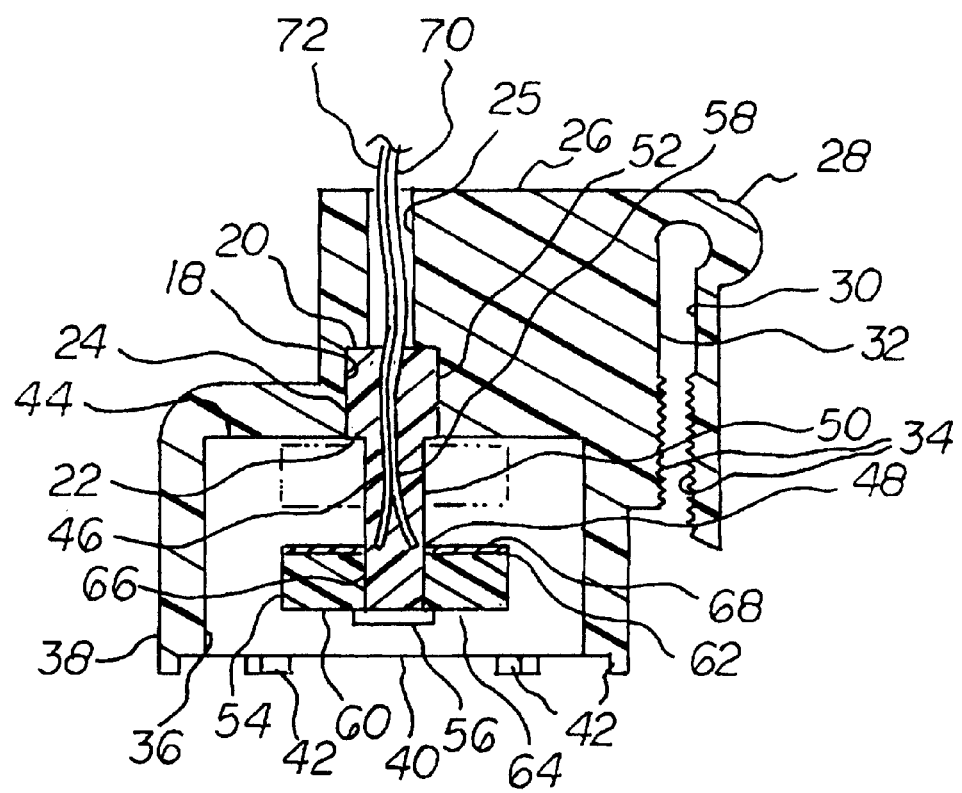
FIG. 4 is a cross sectional view taken along line 4—4 of FIG. 3.

Next provided is a plurality of wires 70, 72. The wires are contained within the passageway of the shaft. The wires are continuous and pass through the shaft up through the hole in the main central tube. In this manner, the wires will provide a signal to activate an electrical component when the float is at the bottom of the shaft; and the wires will provide a signal to inactivate an electrical component when the float is at the top of the shaft. Compare the solid line showing of the float in FIG. 4 with the dashed line showing and the proximity of the induction disk 68 to the free ends of the wires with insulated coatings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. An electrical inductance overflow switch for allowing the user to safely and conveniently control the level of a fluid in an air conditioner tray by the activation and deactivation of the production of the fluid comprising, in combination:

a switch housing fabricated of a rigid material and having a lower portion and an upper portion with the upper portion having a main central tube in a round tubular cylindrical configuration with a top end and a bottom end and a circumferential wall there between and a hole through the length of the main central tube running from the top end to the bottom end with the main central tube having a rectilinear sideways extension running outwards from the main central tube and terminating with a mounting clamp, the mounting clamp having a generally flat, U-shaped configuration with an outer surface and an inner surface with a pair of gripping serrations on the surfaces for allowing the clamp to grip a recipient surface, the lower portion of the housing having a generally round configuration with an inner face and an outer face and a wall thickness there between with the lower portion having an open lower end with a plurality of downwardly projecting legs and a closed upper end coupled to the upper portion with a central passageway through the upper end of the lower portion forming a continuous passageway through the main tube to the top end;

a switch subassembly having a switch shaft fabricated of a rigid electrically insulating material and having a generally round cylindrical configuration with an enlarged upper end and an enlarged lower end and a bearing surface there between, with the upper end of the shaft coupled with the main central tube of the housing, and the lower end of the shaft including a flanged end piece, with the shaft having an inner wire passageway running from the top of the shaft to between about sixty-five percent and seventy-five percent of the length of the shaft, with the subassembly also having a float fabricated of rigid electrically conductive material having a donut-shaped configuration with a top side and a bottom side and a thickness therebetween and with a central hole running therethrough with the hole sized to allow the float to move freely up and down the bearing surface, with the float having a washer shaped induction disk fabricated of a buoyant material coupled to the top of the float; and, a plurality of wires being contained within the passageway of the shaft with the wires being continuous and passing through the shaft up through the hole in the main central tube whereby the wires will provide a signal to activate an electrical component when the float is at the bottom of the shaft and the wires will provide a signal to inactivate the electrical component when the float is at the top of the shaft.

2. An electrical inductance overflow switch comprising:

a housing having a lower portion and an upper portion with the upper portion having a main central tube with a top end and a bottom end and a hole running from the top end to the bottom end with the tube having a sideways extension running outwards from the tube and terminating with a mounting clamp having gripping serrations, the lower portion of the housing having an open lower end with a plurality of downwardly projecting legs and a closed upper end coupled to the upper portion forming a continuous passageway through the tube to the top end;

a switch subassembly having an enlarged upper end and an enlarged lower end and a shaft therebetween coupled with the tube of the housing and with the shaft having an inner wire passageway running from the top of the shaft with the subassembly also having a float fabricated of rigid electrically conductive material having a donut-shaped configuration with a central hole running therethrough with the hole sized to allow the float to move freely up and down the bearing surface, with the float having a washer shaped induction disk coupled to the top of the float; and a plurality of wires contained within the passageway of the shaft.

3. The system as set forth in claim 2 wherein the inner wire passageway runs from the top of the shaft to between about sixty-five percent and seventy-five percent of the length of the shaft.

4. The system as set forth in claim 2 wherein the wires are continuous and pass through the shaft up through the hole in the tube whereby the wires will provide a signal to activate an electrical component when the float is at the bottom of the shaft and the wires will provide a signal to inactivate the electrical component when the float is at the top of the shaft.

\* \* \* \* \*